(12) United States Patent  
Enniss et al.

(10) Patent No.: US 9,303,132 B2
(45) Date of Patent: Apr. 5, 2016

(54) EXTERIOR WINDOW FILM

(75) Inventors: James P. Enniss, Martinsville, VA (US); Scott Pickett, Martinsville, VA (US)

(73) Assignee: CPFilms Inc., Fieldale, VA (US)

( * ) Notice: Subject to any disclaimer, the term of this patent is extended or adjusted under 35 U.S.C. 154(b) by 346 days.

(21) Appl. No.: 12/812,010

(22) PCT Filed: Jan. 8, 2009

(86) PCT No.: PCT/IB2009/005001
§ 371 (c)(1),
(2), (4) Date: Sep. 27, 2010

(87) PCT Pub. No.: WO2009/087575
PCT Pub. Date: Jul. 16, 2009

(65) Prior Publication Data
US 2011/0027553 A1   Feb. 3, 2011

Related U.S. Application Data

(63) Continuation of application No. 12/008,606, filed on Jan. 11, 2008, now abandoned.

(51) Int. Cl.
*B32B 17/10* (2006.01)
*C08J 7/04* (2006.01)

(52) U.S. Cl.
CPC ............. *C08J 7/04* (2013.01); *B32B 17/10018* (2013.01); *B32B 2367/00* (2013.01); *C08J 2367/02* (2013.01); *C08J 2433/12* (2013.01);
(Continued)

(58) Field of Classification Search
CPC ...... B32B 27/16; B32B 27/40; B32B 27/308; B32B 2255/28; B32B 2310/0831; B32B 2367/00; C08J 7/042; C08J 7/18; C08J 2475/04; C08J 2433/08–2433/12; C08G 18/6225–18/6237; C08G 18/672–18/673; C08G 18/8116; C08G 18/8175; C08F 290/067; C08L 75/004
See application file for complete search history.

(56) References Cited

U.S. PATENT DOCUMENTS 3,043,709 A   7/1962   Amborski
4,115,617 A   9/1978   Mitsuishi et al.
(Continued)

FOREIGN PATENT DOCUMENTS

DE   19754107 C1   2/1999
DE   10034197 A1   1/2002
(Continued)

OTHER PUBLICATIONS

Machine Translation of JP2004-277629. Retrieved Sep. 27, 2012.*
(Continued)

*Primary Examiner* — Prashant J Khatri
(74) *Attorney, Agent, or Firm* — John P. Foryt

(57) ABSTRACT

A transparent exterior window film composite comprising a base sheet material having an outer PET (polyethylene terephthalate) film layer which has been surface treated to elevate adhesion thereto and which is impregnated with an ultra violet light absorber (UVA), the treated surface being coated with a UV stabilized acrylic polymer or co-polymer undercoat having a UV stabilized hard coat layer thereon formed from at least one aliphatic urethane acrylate oligomer and at least one multifunctional acrylate monomer, the undercoat layer having a thickness which is at least as thick as the hard coat.

21 Claims, 1 Drawing Sheet

(52) U.S. Cl.
CPC ........ *C08J2475/04* (2013.01); *Y10T 428/2495* (2015.01); *Y10T 428/26* (2015.01); *Y10T 428/269* (2015.01); *Y10T 428/2839* (2015.01); *Y10T 428/2843* (2015.01)

(56) References Cited

U.S. PATENT DOCUMENTS

| | | | |
|---|---|---|---|
| 4,185,046 | A | 1/1980 | Pengilly et al. |
| 4,425,981 | A | 1/1984 | Kiesewetter et al. |
| 4,555,433 | A | 11/1985 | Jablonka et al. |
| 4,557,980 | A | 12/1985 | Hodnett, III |
| 4,978,181 | A | 12/1990 | Inanuma et al. |
| 5,618,626 | A | 4/1997 | Nagashima et al. |
| 5,665,801 | A | 9/1997 | Chang et al. |
| 5,740,649 | A | 4/1998 | Fuchs et al. |
| 6,007,901 | A | 12/1999 | Maschwitz et al. |
| 6,221,112 | B1 | 4/2001 | Snider |
| 6,416,872 | B1 | 7/2002 | Maschwitz |
| 6,420,451 | B1* | 7/2002 | Lin et al. ............ 522/83 |
| 6,440,551 | B1 | 8/2002 | Enniss et al. |
| 6,500,876 | B2 | 12/2002 | Weikard et al. |
| 6,562,440 | B1* | 5/2003 | Tsuchiya et al. ........... 428/195.1 |
| 6,569,928 | B1 | 5/2003 | Levchik et al. |
| 6,773,778 | B2 | 8/2004 | Onozawa et al. |
| 6,998,425 | B2* | 2/2006 | Chisholm et al. ............. 522/182 |
| 7,375,144 | B2 | 5/2008 | Gilmer |
| 8,617,715 | B2 | 12/2013 | Shively et al. |
| 2003/0036604 | A1 | 2/2003 | Meisenburg et al. |
| 2003/0171449 | A1 | 9/2003 | Nienhaus et al. |
| 2004/0209020 | A1 | 10/2004 | Castiglione et al. |
| 2004/0242735 | A1 | 12/2004 | McMan et al. |
| 2005/0121665 | A1 | 6/2005 | Gillissen et al. |
| 2006/0134400 | A1 | 6/2006 | Takada et al. |
| 2006/0216524 | A1* | 9/2006 | Klun et al. ................. 428/423.1 |
| 2008/0166569 | A1 | 7/2008 | Gasworth et al. |
| 2009/0162592 | A1 | 6/2009 | Baikerikar et al. |
| 2009/0181242 | A1 | 7/2009 | Enniss et al. |
| 2011/0027553 | A1 | 2/2011 | Enniss et al. |

FOREIGN PATENT DOCUMENTS

| | | |
|---|---|---|
| JP | 05230281 | 7/1993 |
| JP | 2004277629 A | 10/2004 |
| KR | 100759101 B1 | 9/2007 |
| WO | 9606885 A1 | 3/1996 |
| WO | 9929979 A1 | 6/1999 |
| WO | 0168360 A1 | 9/2001 |
| WO | 2006008518 A1 | 1/2006 |
| WO | 2009087575 A1 | 7/2009 |
| WO | WO 2009/086285 A1 | 7/2009 |

OTHER PUBLICATIONS

Kasten, U. "Organic Light Stabilizers for Industrial Coatings". Ciba, Presented Jun. 8, 2000; pp. 1-38.*
"Sartomer Technical Datasheet: CN968". Sartomer, (2011).*
"Sartomer Technical Datasheet: CN962". Sartomer, (2003).*
"Sartomer Technical Datasheet: CN983". Sartomer, (2011).*
Masson et al. "UV-radiation curing of waterbased urethane-acrylate coatings". Progress in Organic Coatings, 39 (2000); pp. 115-126.*
International Search Report, International Patent Application No. PCT/IB2009/005001, mailed Jul. 20, 2009, 3 pages.
ASTM G155; "Standard Practice for Operating Xenon Arc Light Apparatus for Exposure of Non-Metallic Materials".
ASTM D1003; "Standard Test Method for Haze and Luminous Transmittance of Transparent Plastics".
ASTM D3359; "Standard Test Methods for Measuring Adhesion by Tape Test".
ASTM D1044; "Standard Test Method for Resistance of Transparent Plastics to Surface Abrasion".
International Search Report for International Application No. PCT/EP2004/013518 mailed Jun. 30, 2005.
Copending U.S. Appl. No. 13/433,920, filed Mar. 29, 2012, Port et al.
International Search Report for International Application No. PCT/US2012/031520 mailed Oct. 31, 2012.
Copending U.S. Appl. No. 10/729,587, filed Dec. 6, 2003, Shively et al.
USPTO Notice of Allowance for U.S. Appl. No. 10/729,587 dated Aug. 21, 2013.
USPTO Office Action for U.S. Appl. No. 13/433,920 dated Dec. 18, 2013.
USPTO Office Action for U.S. Appl. No. 10/729,587 dated Dec. 16, 2004.
USPTO Office Action for U.S. Appl. No. 10/729,587 dated Jun. 3, 2005.
USPTO Office Action for U.S. Appl. No. 10/729,587 dated Feb. 2, 2006.
USPTO Office Action for U.S. Appl. No. 10/729,587 dated Jul. 14, 2006.
USPTO Office Action for U.S. Appl. No. 10/729,587 dated Jan. 22, 2007.
USPTO Office Action for U.S. Appl. No. 10/729,587 dated Aug. 8, 2007.
USPTO Office Action for U.S. Appl. No. 13/433,920 dated Jul. 25, 2013.
USPTO Office Action for U.S. Appl. No. 13/433,920 dated Apr. 29, 2014.
USPTO Office Action for U.S. Appl. No. 13/433,920 dated Oct. 16, 2014.
USPTO Notice of Allowance for U.S. Appl. No. 13/433,920 dated Feb. 10, 2015.

* cited by examiner

EXTERIOR WINDOW FILM

CROSS REFERENCE TO RELATED APPLICATIONS

This application is a §371 National Phase of PCT Application Serial Number PCT/IB2009/005001, filed Jan. 8, 2009, which is a Continuation of and claims priority to U.S. patent application Ser. No.: 12/008,606 filed Jan. 11, 2008 now abandoned. The entire disclosure of both documents is herein incorporated by reference.

FIELD

This invention relates to exterior window film which is adhered to the outside of window glazing typically but not exclusively to the window glazing of buildings.

BACKGROUND OF THE INVENTION

Window film is adhered to the outside of windows for many different reasons for example, the film may act as a safety film to prevent the shattering of glass when impacted. Another use of window film is solar control film which may reflect light at particular wavelengths or may absorb light of particular wavelengths. As is disclosed in U.S. Pat. No. 6,773,778, exterior window film typically comprises a base film or film laminate which is provided with a hard coat layer on its external surface.

The film surface to which the hard coat layer is applied may be subjected, if desired, to surface treatment by an oxidation method or a roughening method for the purpose of elevating the adhesive property with a layer provided on the surface thereof.

Exterior window film typically has a service life in the order of about 24 months and typically fails due to the loss of hard coat adhesion to the base substrate. When cycled in an Atlas Xenon Weatherometer according to ASTM G 155, a typical window film will fail in 600-900 hours due to loss of adhesion between the hard coat and the base film material when subjected to tape testing.

U.S. Pat. No. 6,787,236 describes a window film having a primer layer provided on one face of the base material with the hard coat applied over the primer layer. The primer layer is required to have a good adhesion with both the hard coat layer provided thereon and the base material. Conventionally known primers, are for example, primers of an acryl base, a polyester base, a polyurethane base, a silicone base and a rubber base.

The present invention provides for an exterior window film laminate with improved adhesion between the hard coat and the base material and which has improved resistance to the weather.

STATEMENTS OF INVENTION

According to a first aspect of the present invention there is provided a transparent exterior window film composite comprising a base sheet material having an outer PET (polyethylene terephthalate) film layer which has been surface treated to elevate adhesion thereto and which is impregnated with a ultra violet light absorber (UVA), the treated surface being coated with an acrylic polymer or co-polymer undercoat having a urethane-acrylate hard coat layer thereon formed from at least one urethane acrylate oligomer and at least one multi-functional acrylate monomer, the undercoat having a thickness which is at least as thick as the hard coat.

The polymerizable acrylic and acrylate matrices of the undercoat and hard coat contain one or more crosslinking agents that are useful in the production of the crosslinked under coat and hardcoat of the present invention. The crosslinking agents are selected from di- or polyfunctional moieties which are capable of crosslinking oligomers. In general, the reactive functionalities which serve as active sites for such crosslinking are chemical groups containing double bonds as is well known to those skilled in the art, who similarly recognize that it is necessary for such agents to have at least two reactive functionalities.

The surface treatment may include any suitable method, for example an oxidation method or a roughening method. The oxidation method may include, for example, corona discharge treatment, chromic acid treatment (wet type), flame treatment, hot air treatment, ozone and UV ray irradiation treatment. The surface treatment may further include a chemical treatment such an acrylic primer layer.

To prevent or inhibit photodegradation of a composite, at least one ultraviolet light stabilizer can be incorporated into or applied to one or more of the layers comprising the composite. UV stabilizers include materials that inhibit photoinitiation by absorbing UV light (UVAs). Other stabilizers quench excited states of atoms capable of initiating undesired breakdown chemical reactions. One known agent is nickel phenolate found in Cyasorb UV 1084. Some stabilizer additives scavenge radicals formed during photodegradation of molecules upon weathering. Examples of these scavengers are hindered phenolics commercially found as Irganox 565 or hindered benzoates such as Cyasorb UV 2908. The class of hindered amines are useful for scavenging radicals as well to protect the coating ingredients from break down such as Cyasorb 3346 or Tinuvin 123. Hydroperoxide decomposition is another method for preventing chemical breakdown during weathering of coatings. The peroxides formed can be arrested by thioesters such as Cyanox LTDP and nickel dibutyl dithiocarbamates found in the antiozone compound agent NIBUD from Akrochem.

UVAs function by competitively absorbing the UV energy that causes photodegradation of the structure. A wide variety of ultraviolet light-absorbing compounds are available including, for example, benzophenones (e.g., materials sold under the trade names CYASORB UV-531 (available from Cytec Industries Inc., located in West Paterson, N.J.), and UVINUL 3008 (available from BASF, located in Mount Olive, N.J.)), benzotriazoles (e.g., materials sold under the trade names CYASORB UV-5411 (available from Cytec Industries Inc.), and TINUVIN 329, TINUVIN 360, and TINUVIN 571 (available from Ciba Specialty Chemicals North America, located in Tarrytown, N.Y.)), triazines (e.g., materials sold under the trade names CYASORB UV-1164 (available from Cytec Industries Inc.), and TINUVIN 400, 460, 477, and 479 (available from Ciba Specialty Chemicals), oxanilides (e.g., materials sold under the trade names TINUVIN 312 (available from Ciba Specialty Chemicals North America), and SANDUVOR VSU (available from Clariant AG, located in Muttenz, Switzerland)), benzoxazinones (e.g., CYASORB UV-3638 (available from Cytec Industries Inc.), cyanoacrylates (e.g., UVINUL 3039 (available from BASF)), and benzilidine malonates (e.g., HOSTAVIN PR-25 (available from Clariant AG). Inorganic UV absorbers include Titanium dioxide, Zinc oxide, and cerium oxide which are added in the form of small particles, preferably as nanoparticles.

Preferably the undercoat comprises a coating of a cured acrylic or urethane-acrylic based resin, preferably formed from an aqueous dispersion and containing UV absorber, preferably up to 3% by weight of organic UV absorber or up to 5% by weight of inorganic absorber.

The undercoat preferably has a thickness of between 6 and 20 microns and, preferably between 6-12 microns.

The urethane acrylate oligomer of the hard coat is preferably an aliphatic urethane acrylate oligomer, including those having aliphatic cyclic structures, having a glass transition temperature, or Tg, higher than 80° C. with an elongation less than 10%, preferably less than 5%.

Preferred multifunctional acrylate monomers are dipentaerythritol pentaacrylate, pentaerythritol tetraacrylate, pentaerythritol triacrylate, ditrimethylolpropane tetraacrylate, trimethylolpropane triacrylate, tricyclodecane dimethanol diacrylate, 1,6 hexanediol diacrylate, cyclohexane dimethanol diacrylate, and dioxane glycol diacrylate.

The hard coat contains at least one UV stabiliser and preferably has a thickness of between 6-8 microns preferably with an abrasion resistance as measured by change in haze measurements after abrasion testing of less than 12%.

The hard coat and undercoat are cured by any suitable process such as electron beam curing, or light curing using one or more photoinitiators. In general, the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source. Preferably the hard coat and undercoat are cured by UV light and suitable UV photoinitiators, include monoacylphosphine oxide and bisacylphosphine oxide. Commercially available mono or bisacylphosphine oxide photoinitiators include 2,4,6-trimethylbenzoyldiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoly)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation Darocur 1173. Other photoinitiators are commercially available under the tradenames "Darocur 4265", "Irgacure 651", "Irgacure 1800", "Irgacure 369", "Irgacure 1700", and "Irgacure 907". The photoinitiator is generally added at about 0.5 to 4 phr (part per hundred resin) to the resin composition. More or less can be employed depending on the requirements for color and cure speed, and other design criteria.

The hard coat has preferably been cured under an inert atmosphere such as a nitrogen atmosphere.

The hard coat may be made hydrophobic by the addition of a hydrophobic additive which helps the run-off of water by reducing the surface energy. This improves dirt shedding properties of the film composite. Such additives include silicone acrylates, preferably oligomers of silicone acrylates and fluorinated urethane acrylates, preferably up to 4% by weight.

The hard coat may contain a nanoparticle dispersion therein. Nanoparticles should have a size of less than 0.1 microns in diameter which are utilised as inorganic UVA's as discussed above, or to increase surface hardness. Inorganic nanoparticles such as zinc oxide, and cerium oxide may be used as UVAs as discussed above and silicone dioxide and aluminium oxide may be used to increase surface hardness and abrasion resistance as is well known.

The PET (polyethylene terephthalate) outer film layer of the base sheet material is about ½-7 mil (0.0125-0.18 mm) thick which has been surface treated by chemical treatments to improve adhesion. The film may be further treated with a UV absorbing material as is disclosed in U.S. Pat. No. 6,221,112. The film composite may further include as a base material any solar control film or safety film. Examples of solar control film are disclosed in U.S. Pat. Nos. 6,416,872 and 6,007,901.

The base sheet material on its other surface of the polymeric film may be coated with a pressure sensitive adhesive, preferably containing UVA, which in use adheres to the film layer and in use may adhere the composite to glazing. Prior to use of the composite, the adhesive may be covered with a release liner.

Glazing includes any suitable transparent sheet material which may be used for motor cycle helmet visors, vehicle windscreens, aircraft canopies and windscreen and windows, PC Monitor Screens etc. and which include glass, acrylic sheet, polyester sheet, polycarbonate sheet.

The composite film has a visible light transmission in the range of 5-85% VLT. VLT is visible light transmission calculated using CIE Standard Observer (CIE 1924 1931) and D65 Daylight.

Composite film when tested for adhesion after being subjected to weather testing in accordance with ASTM G 155 exceeded 1200 hours before adhesion failure of the hard coat and with the preferred hard coat formed from a mixture of acrylate monomers the minimum life expectancy before adhesion failure was between 1500-2400 hours.

Preferably the hard coat when cured under inert conditions provides for a composite having a life expectancy of at least 3000 hours before failure of the adhesion of the hard coat to the PET base material.

DESCRIPTION OF DRAWINGS

The invention will be described by way of Example and with reference to the accompanying drawings in which.

DETAILED DESCRIPTION OF THE INVENTION

Figure 1:
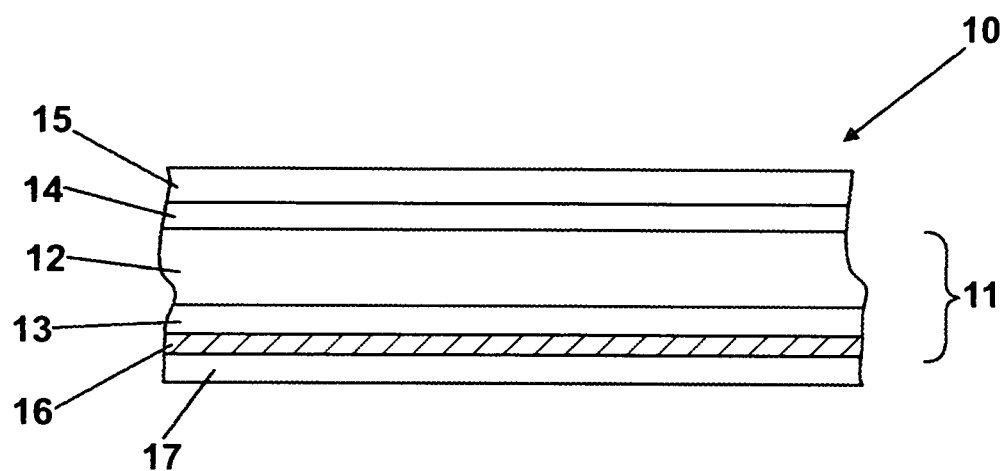
FIG. 1 is a schematic drawing a film composite according to the present invention.

With reference to FIG. 1 of the accompanying drawings there is shown an exterior window film composite 10 comprising a base sheet material 11 which in the present example is a solar control film laminate but could be safety film or anti-graffiti film.

Figure 2:
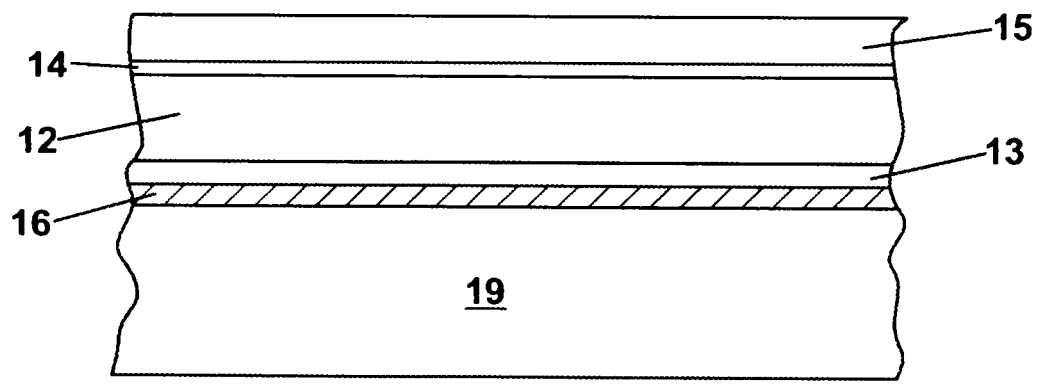
FIG. 2 is a schematic of the film composite of FIG. 1 in situ on a glazing panel

In the present example the base laminate 11 comprises a first layer 12 of a transparent polyester film laminated to a metallized film layer 13. Both the first layer and the metallized film layer 13 comprise polyethylene terephthalate (PET) film. The base material 11 is coated in an undercoat layer 14 which is covered with a protective hard coat 15. The other side of the base sheet material 11 may be coated in an adhesive layer 16 for adhering the window film 10 to glazing 19 (see FIG. 2). The adhesive in turn is covered by a release liner 17.

The adhesive layer is a pressure sensitive adhesive, preferably an acrylic based adhesive for example, Gelva 263 available from Cytec Industries, preferably containing up to 8 wt % UVA, typically a hydroxy benzophenone type such as Maxgard 800. The release liner 17 may comprise a polyethylene coated paper, or a silicone release liner, that can be peeled from the adhesive leaving the adhesive on the base material 11. Other suitable adhesives types and adhesives that are commonly used in adhering films such as solar control films, anti-graffiti film or safety film to glazing may also be used.

The PET first film layer 12 of the base material 11 comprises a surface treated PET film about 0.0125-0.18 mm [½ to 7 mil] in thickness and which has preferably been chemically treated with an acrylic surface treatment to improve adhesion. A suitable PET film is DuPont Teijin Films' Melinex 454. The film 12 is treated with a UV absorber as is described in U.S. Pat. No. 6,221,112B so as to absorb in the order of 99% of UV Radiation.

The undercoat 14 may be formed from a solvent based or water based composition comprising acrylic or acrylic-urethane based polymer cured by UV, isocyanates or aziridines. Some acrylic content is necessary to promote adhesion to the PET base material 12. The preferred undercoat layer 14 is formed from a water based UV cured acrylic-urethane hybrid dispersion having the following composition given in table 1:

TABLE 1

| Photoinitiator | 0.4-2.0 parts |
|---|---|
| UV absorber | 3.0-6.0 parts |
| Acrylic Urethane Dispersion | 100 parts |

The parts are parts by weight.

The preferred photoinitiator is an alpha-hydroxyketone type which is suitable for use in water based systems such as Esacure KIP EM (Lamberti), Irgacure 500 (Ciba Specialty Chemicals), or Irgacure 2959 as a solution in a water miscible solvent (Ciba Specialty Chemicals).

The UV absorber can be an organic UV absorber suitable for use in water based resins such as Tinuvin 477-DW which is an aqueous dispersion of hydroxyphenyl-triazine, available from Ciba Specialty Chemicals or an inorganic UV absorber such as Rhodigard W 200 available from Rhodia and which is an aqueous dispersion of cerium oxide. The preferred UV absorber is the organic UVA which provides a composite having an increased resistance to weathering as compared with the inorganic UVA.

The undercoat 14 is coated onto the base material by any suitable method for example bar coating, slot die, or reverse gravure process to provide a dry film thickness of between 6-20 microns and preferably in the order of 6-12 microns. The undercoat layer 14 is dried in a 100° C.-105° C. oven for 60-90 seconds. The applied coating 14 can be cross linked using an appropriate method.

The preferred method of curing is using UV radiation, preferably using UV light having a wavelength between about 360-440 nm is preferred, with light having a wavelength of about 395-440 nm being most preferred. A variety of UV light sources can be employed. Representative sources include but are not limited to a FUSION™ H-bulb high-intensity mercury lamp (which emits three bands centered at 254, 313, 365 nm and is commercially available from Fusion UV Systems, Inc.), a FUSION D-bulb iron-doped mercury lamp (which adds emission at 380-400 nm but which may emit less at lower wavelengths, and is commercially available from Fusion UV Systems, Inc.) and a FUSION V-bulb gallium-doped mercury lamp (which adds emission at 404-415 nm but which may emit less at lower wavelengths, and is commercially available from Fusion UV Systems, Inc.). In general, lower wavelengths promote surface cure and higher wavelengths promote bulk cure. A FUSION D-bulb generally represents a desirable overall compromise.

The present undercoat is cured under the UV lights on a conveyor running at 30 feet per minute. The undercoat can be either UV cured in air or under inert conditions, e.g., under a nitrogen atmosphere to provide inert curing.

The cured undercoat layer 14 should be sufficiently hard to prevent blocking and surface deformation when the film is wound into a roll prior to the application of the hard coat. The preferred cured undercoat has a König hardness of 100 according to ASTM D4366-65. The undercoated film may be held in storage before the addition of the hard coat 15.

The preferred aqueous dispersion is Lux 285 which is available from Alberdingk-Boley and the composition of the preferred undercoat is given in table 2 below:

TABLE 2

| Irgacure 2959 | 2 parts* |
|---|---|
| Tinuvin 477-DW | 6 parts |
| Lux 285 | 100 parts |

*The photoinitiator Irgacure 2959 is used for curing in air and is added in the form of a 40% solution by weight in a water miscible solvent The cured undercoated film is then passed onto a further coating process for the application of the hard coat 15. The hard coat 15 is a cured acrylate based resin which is formed from a liquid composition which is applied to the undercoat layer 14 by any suitable process, for example bar coating, slot die coating, and reverse gravure process. The hard coat composition is given in table 3 below.

TABLE 3

| Photoinitiator | 0.5-5.0 parts |
|---|---|
| UV stabilizers | 1.0-3.0 parts |
| Urethane Oligomer | 36-70 parts |
| Acrylate monomer | 20-50 parts |
| Solvent | 30-80 parts |

The parts are parts by weight

Acetate and ketone solvents are preferred in these formulations. Suitable solvents are acetone, methyl ethyl ketone, methyl isobutyl ketone, n-butyl acetate, and ethyl acetate. The hard coat composition can contain one or more of said solvents. Suitable UV photoinitiator and UV stabilizers have been discussed previously.

The oligomer should be an acrylate oligomer, preferably an aliphatic urethane acrylate oligomer having a glass transition temperature, or Tg, higher than 80° C. with an elongation of less than 10%, preferably less than 5%. Aliphatic acrylate oligomers include cycloaliphatic and heterocyclic aliphatics. The harder non-yellowing urethane oligomers are preferred. Suitable urethane acrylate oligomers are CN983, CN963B80, CN985B88, and CN2920 from Sartomer (Total).

Suitable acrylate monomers are diacrylates or a mixture of polyacrylates. A suitable polyacrylate is dipentaerythritol pentaacrylate (available as Sartomer SR399), and a suitable mixture of diacrylates comprises 10-30 parts of Sartomer SR-399 with 10-20 parts of at least one of tricyclodecane dimethanol diacrylate (available as Sartomer SR833 S), and dioxane glycol diacrylate (available as Sartomer CD536).

Samples of the base material having the preferred undercoat given in table 2, were coated with the hard coat compositions according to table 3 to a cured hard coat thickness of 6.0-8.0 microns. The hardcoat is then dried in an 80° C.-85° C. oven for 30-45 seconds. The coating is cured by a suitable method, in this case using UV curing, preferably under inert conditions with an oxygen concentration of between 600-900 parts per million. The running speed is 80-100 feet per minute. UV cure details are similar to the conditions for the undercoat 14 given above.

Samples were then tested for adhesion of the hardcoat 15 to the base material 11 by weathering the composite 10 using an Atlas Xenon Weatherometer according to ASTM G 155 and then testing for adhesion of the hard coat every 300 hours. Samples were failed due to loss of adhesion between the hard coat and the base film material 11. All samples were evaluated on a pass/fail determination based on testing with 3M 810 and 600 tape. The tape was pressed onto the sample surface and left for approximately 10 seconds and then pulled off at a 180° angle. The adhesion test was in accordance with ASTM D 3359 excepting that the samples were not cross-hatched. The samples were not cleaned or marked prior to testing.

It was found that samples had a minimum weathering life of 1200 hours before adhesion failure. This life expectancy could be increased to 1500-2400 hours before adhesion failure by using a mixture of acrylate monomers in the hard coat.

It has been noted that the life expectancy of the samples can be further increased by curing the hard coat in a nitrogen atmosphere. This may be due to the increase in the efficiency of the curing process due to the absence of oxygen which may react with free radicals in the coating and inhibit the curing process. When curing in air it may be necessary to increase the photoinitiator content which may be as high as 5%.

The preferred hard coat 15 is formed from a composition given in table 4 below for UV cure in inert conditions.

TABLE 4

| | |
|---|---|
| Photoinitiator (Irgacure 819) | 0.65% |
| UV Stabilizers (Tinuvin 477 and 123 in a 4:1 ratio by weight) | 2.5% |
| Urethane Oligomer (Sartomer CN985B88) | 36.0% |
| Tricyclodecane Dimethanol Diacrylate (Sartomer SR833 S) | 10.0% |
| Dipentaerythritol pentaacrylate (Sartomer SR399) | 20.0% |
| Solvent | Remainder |

The percentages are approximate percentages by weight.

Samples having the preferred hard coat have a life of 3000 hours or longer when cured under nitrogen.

The abrasion resistance of the preferred hard coat was measured as a change in haze in accordance with ASTM D1003 after abrasion using a Taber Abrader in accordance with ASTMS D 1044 using CS-10 Type 3 wheels each loaded to 500 g. The results are quoted in a change in haze value after 50 cycles.

The surface of the hard coat may be made hydrophobic by the addition of up to 4% by weight of a hydrophobic material additive to the composition. Potential additives include silicone and fluorinated acrylate oligomers that render the hardcoat hydrophobic. Other beneficial attributes may include easy clean, dirt release, anti-stain, anti-soil, and antigraffiti properties. Suitable additives include CN4000, NTX7980 (Sartomer), Ebecryl 1360 (Cytec Surface Specialties), Fluorolink 5113X, MD 700 (Solvay Solexis), BYK 371, BYK-UV 3570, BYK-SILCLEAN 3710 (BYK Chemie), CoatOSil 3503, CoatOSil 3509 (Momentive Performance Materials), TEGO Rad 2250, TEGO Rad 2500, TEGO Rad 2600 (Evonik Industries).

The preferred additive is a fluorinated urethane acrylate, e.g. Fluorolink 5113X available from Solvay Solexis, Italy, which is added prior to curing under nitrogen.

The invention claimed is:

1. A transparent exterior window film composite comprising:
a base sheet material having an outer polyethylene terephthalate film layer comprising a UV absorber;
an undercoat layer coated on the polyethylene terephthalate film layer, wherein the undercoat layer comprises a UV light-cured, water-based acrylic or urethane-acrylic polymer and wherein the undercoat layer has a thickness of about 6 to about 20 microns;
a hard coat layer coated on the undercoat layer, formed from at least one aliphatic urethane acrylate oligomer having a functionality of 2 and at least two multifunctional acrylate monomers selected from the group consisting of tricyclodecane dimethanol diacrylate, dioxane glycol diacrylate, 1,6-hexanediol diacrylate, cyclohexane dimethanol diacrylate, dipentaerythritol pentaacrylate and combinations thereof, and wherein said hard coat layer has a thickness of about 6 to about 8 microns, and wherein the undercoat layer is at least as thick as the hard coat layer; and wherein the film composite has a life of 1500 to 2400 hours before adhesion failure between the hard coat and the base sheet material when tested in accordance with ASTM G 155.

2. The film composite of claim 1, wherein the undercoat has a thickness of between about 6 and about 12 microns.

3. The film composite of claim 1, wherein the surface of the outer polyethylene terephthalate layer is treated by oxidation, roughening, or by coating with an acrylic primer.

4. The film composite of claim 1, wherein the aliphatic urethane acrylate oligomer has a glass transition temperature higher than 80° C. with an elongation less than 10%.

5. The film composite of claim 4, wherein the hard coat further comprises up to 4% by weight of a hydrophobic additive.

6. The film composite of claim 1, wherein the at least two multifunctional acrylate monomers comprise dipentaerythritol pentaacrylate and tricyclodecane dimethanol diacrylate.

7. The film composite of claim 1, wherein the hard coat layer is formed from the aliphatic acrylate monomer and at least three multifunctional acrylate monomers.

8. The film composite of claim 1, wherein the hard coat layer further comprises nanoparticle dispersion.

9. The film composite of claim 1, wherein the base sheet material is coated with a pressure sensitive adhesive on the side opposite of the undercoat layer.

10. The film composite of claim 9, wherein the pressure sensitive adhesive is covered with a release liner.

11. The film composite of claim 1, wherein the undercoat layer and hard coat layer are cured by UV light under an air or nitrogen atmosphere.

12. The film composite of claim 1, wherein at least one of the undercoat and the hard coat layers comprises residues of at least one di- or poly-functional cross-linking agent.

13. The film composite of claim 1, wherein the at least two multifunctional acrylate monomers comprise dipentaerythritol pentaacrylate and tricyclodecane dimethanol diacrylate.

14. A transparent exterior window film composite comprising:
a base sheet material having an outer polyethylene terephthalate film layer coated with an undercoat layer comprising a water-based, UV light-cured urethane-acrylic polymer and having a thickness of about 6 to about 12 microns;
a UV light-cured hard coat layer coated on the undercoat layer having a thickness of about 6 to about 20 microns and formed from at least one aliphatic acrylate urethane oligomer having a functionality of 2 and a glass transition temperature higher than 80° C. with an elongation less than 10%, and at least two multifunctional acrylate monomers selected from the group consisting of tricyciodecane dimethanol diacrylate, dioxane glycol diacrylate, 1,6-hexanediol diacrylate, cyclohexane dimethanol diacrylate, dipentaerythritol pentaacrylate, and combinations thereof, and a UV stabilizer; wherein the film composite has a life of 1500 to 2400 hours before adhesion failure between the hard coat and the base sheet material when tested in accordance with ASTM G 155.

15. The film composite of claim 14, wherein at least one of the undercoat and the hard coat layers comprises residues of at least one di- or poly-functional cross-inking agent.

16. The film composite of claim 14, wherein sad at least two multifunctional acrylate monomers comprises at least three multifunctional acrylate monomers selected from the group consisting of tricyclodecane dimethanol diacrylate, dioxane glycol diacrylate, 1,6-hexanediol diacrylate, cyclohexane dimethanol diacrylate, dipentaerythritol pentaacrylate and combinations thereof.

17. A transparent exterior window film composite comprising:
    a base sheet material comprising a polyethylene terephthalate film layer that comprises at least one UV absorber;
    an undercoat layer coated onto a surface of the polyethylene terephthalate film layer, wherein the undercoat layer comprises at least one UV light-cured, water-based acrylic or urethane-acrylic polymer and has a thickness in the range of from about 6 to about 20 microns; and
    a hard coat layer coated onto a surface of the undercoat layer, wherein the hard coat layer comprises at least one aliphatic acrylate urethane oligomer, at least two multifunctional acrylate monomer, and is UV stabilizer,
    wherein said at least two multifunctional acrylate monomers are selected from the group consisting of tricyclodecane dimethanol diacrylate, dioxane glycol diacrylate, 1,6-hexanediol diacrylate, cyclohexane dimethanol diacrylate, dipentaerythritol pentaacrylate and combinations thereof; and the film composite has a life of 1500 to 2400 hours before adhesion failure between the hard coat and the base sheet material when tested in accordance with ASTM G 155.

18. The film composite of claim 17, wherein the aliphatic urethane acrylate oligomer has a glass transition temperature higher than 80° C. with an elongation of less than 10% and wherein the at least two multifunctional acrylate monomers comprise dipentaerythritol pentaacrylate and tricyclodecane dimethanol diacrylate.

19. The film composite of claim 17, wherein the hard coat layer has a thickness in the range of from about 6 to about 8 microns.

20. The film composite of claim 17, wherein at least one of the undercoat and the hard coat layer comprises residues of at least one di- or poly-functional cross-linking agent.

21. The film composite of claim 17, wherein said at least two multifunctional acrylate monomers comprises at least three multifunctional acrylate monomers selected from the group consisting of tricyclodecane dimethanol diacrylate, dioxane glycol diacrylate, 1,6-hexanediol diacrylate, cyclohexane dimethanol diacrylate, dipentaerythritol pentaacryiate and combinations thereof.

* * * * *